Patented Dec. 3, 1940

2,223,738

UNITED STATES PATENT OFFICE 2,223,738

REFINING OF PIG IRON AND THE PRODUCTION OF STEELS AND ALLOY STEELS

Albert Collinson Nesfield, Ealing, London, England, assignor to Low Moor Alloy Steelworks Limited, London, England No Drawing. Application August 3, 1939, Serial No. 288,172

9 Claims. (Cl. 75—46)

This invention relates to refining of pig iron and to the production of steel and alloy steels from pig iron. By the term "pig iron" is to be understood not only pig iron which is marketed under that name, but also any good quality cast iron scrap.

In the refining of pig iron it is well-known to utilise a puddling furnace wherein the pig iron is refined by a puddling process with the charge maintained at a temperature above the melting point of the pig iron, but below the melting point of the refined iron during which the refined iron is subjected to a "balling" process. This process is relatively slow and to produce alloy steels therefrom a subsequent melting process is necessary during which the alloying materials are added. A further process for producing steel is the well-known "Bessemer" process or modifications thereof wherein the melted pig iron is treated by means of air-blasts for the purpose of oxidizing impurities present in the pig iron such as silicon, manganese and carbon. In this known process of producing steel the necessary alloying materials are added to the melted charge in the "Bessemer" furnace prior to its removal from said converter.

During both of these known processes the phosphorus and sulphur are usually removed by the provision of lime slag and possibly by the addition of soda ash.

One object of the invention is to reduce the time taken to produce refined iron, steel or alloy steel from the pig iron.

Another object of the invention is to provide an improved and cheaper process of refining pig iron for the ultimate production of steel or alloy steels.

A further object of the invention is to provide a continuous process by which a steel or alloy steel may be produced from pig iron without the necessity of allowing the charge to cool down below its melting point during the process and wherein, if desired, refined iron may be tapped off at any suitable stage of the process prior to the addition of any alloying material to the charge and cast immediately in moulds.

The manner in which these and other objects are attained will be more clearly perceived from a consideration of the following description forming a part of this specification.

By way of example the process of producing alloy steel from pig iron will be described in detail. The pig iron may be of approximately the following constitution:

$C = 4.0\%$
$Si = 2.25\%$
$S = 0.025\%$
$P = 0.025\%$
$Mn = 0.5\%$
$Fe = 93.2\%$

A charge of about ten tons of pig iron of this general character is introduced into a reverberatory furnace of known type in which the charge of pig iron is melted in a reducing atmosphere and raised to a temperature of about 1450° C. Depending on the constitution of the pig iron the temperature may vary between 1350–1500° C. During this melting process an additional charge of for example two tons of the pig iron is placed in a pre-heating chamber of the furnace for cold stock the principles governing such pre-heating chambers being well-known in the art and fully set out in "Industrial Furnaces" by W. Trinks (1934) 3rd edition, volume 1, pages 159–162. The temperature is maintained at the above figure and a lime slag is produced by the addition of lime as far as necessary. After the charge has attained the temperature of about 1450° C. for fifteen minutes the phosphorous content and a certain amount of sulphur will have entered the slag. During this initial melting period a reducing atmosphere is preferably maintained by allowing only sufficient air to pass through the burner for providing adequate combustion of the fuel such as powdered fuel whilst maintaining an excess of CO over $CO^2$ in the combustion gases.

At the end of fifteen minutes the burner or burners are tilted downwardly and the slag layer is blown off the metal surface by an oxidizing flame or air-blast to oxidize the silicon and manganese impurities by oxidation. During this oxidizing process the silicon and manganese pass out as a dark brown smoke which according to the amount of air introduced may be accompanied by a certain amount of flame. Preferably only sufficient air is introduced to provide the dark brown smoke without the flame, unlike the process which takes place in a "Bessemer" side-blown converter.

During this stage the charge must be carefully watched as soon as the silicon and manganese have been removed to the desired or to the maximum extent and before any appreciable amount of carbon has been removed by the air-blast which may be determined by observation of the size and colour of the flame in known manner the blowing should be stopped.

At this stage, therefore, the phosphorus and part of the sulphur together with the silicon and manganese have been removed from the molten charge.

A portion of the molten charge, for example two tons is then tapped into a ladle containing soda ash or a mixture of soda ash, limestone and fluorspar to provide for the further removal of the sulphur content and also to bring any slag withdrawn with the molten charge to the surface. Preferably further lime is added to the surface of the tapped charge in the ladle to thicken the slag layer which is then removed.

On removal of the above portion of the charge from the furnace, the two tons of pig iron located in the pre-heating chamber is then introduced into the residual part of the molten charge within the furnace and is replaced by a further two tons of cold pig iron or scrap.

The two tons of molten metal tapped into the ladle is teemed into a two-ton decarbonizing furnace, the bed of which has been previously prepared with iron ore, mill scale or the like to form a lining. The amount of iron ore or mill scale used in the said lining should be only sufficient to eliminate the desired amount of carbon from the known carbon content of the molten charge.

The second furnace which may also be fired with powdered fuel is preferably provided with a regenerator for heating the secondary air so that the latter enters the furnace at about 900° C.–1000° C. Further the furnaces should be so fired as to have burners and air jets at each end of the furnace which should be utilised alternately for about ten minute spells.

Before the melted charge from the ladle is introduced into the furnace the latter may be heated to a temperature of about 1500°–1650° C. On the introduction of the charge the temperature of the latter should be increased to 1600°–1650° C. and lime should be added to form a lime slag.

The burners should be operated to maintain a reducing atmosphere at the abovementioned temperatures and any suitable form of puddling or working with stirring may then be carried out in the furnace in the usual manner if required. The interaction of the charge of partly-refined iron and the oxidizing lining causes removal of the carbon from said charge.

It has been found that the relation between the percentage of carbon remaining in the molten charge and the time of decarbonisation is practically constant and the decarbonization can, therefore, continue for a predetermined time after which the residual content of carbon will be known. Obviously samples of the charge may be tapped and analysed as a check on the process.

During the removal of the carbon the melting point of the refined metal rises and the temperature of the furnace is maintained well above the melting point of the refined metal. This results in the purified metal always remaining fluid and never forming a pasty mass as in the usual puddling furnace.

The next step in the process depends on the desired final product. If soft iron is required with a certain percentage of carbon the charge may be tapped from the puddling furnace at the desired stage of carbon removal. The tapped charge should flow into a ladle which for the reasons previously described may include soda ash to thin down any included slag and to allow its ready removal. The metal withdrawn into the ladle will be quiescent and dead and may be poured into a mould to produce clean ingots.

The decarbonizing process above-described may reduce the carbon content down to 0.03% or less.

If the ultimate product is to comprise steel or alloy steel the metal need not be tapped from the second furnace, but on completion of the removal of the carbon the alloying material may be added to the molten bath, and the latter raised in temperature for a few minutes to allow the alloying process to take place. The resultant alloy steel may then be tapped into the ladle from which ingots are cast in the abovementioned manner.

It is to be understood that the process above-described is a continuous process. The two tons removed from the first reverberatory furnace containing ten tons is replaced by the pre-heated two tons of pig iron. On the introduction of the latter a new lime slag must be provided before the added two tons of pig iron has reached the temperature of the bath. The lower specific gravity of the colder added charge of two tons causes the same to float on the top of the residual eight tons of the initial charge of the molten metal so that slag action and the subsequent oxidizing flame and/or air-blast on the impurities will act substantially only on the added two tons. The oxidizing action for the removal of impurities other than carbon should thus be completed before the upper layer of the molten two tons has reached the temperature and specific gravity of the lower layer of eight tons.

The operation in each furnace, that is to say the oxidizing operation by means of the air-blast in the reverberatory furnace and the further heating and the oxidizing action of the iron ore in the decarbonizing furnace will each take approximately thirty minutes. It may be advisable to provide two decarbonizing furnaces used alternately in order to save time in the relining thereof with the iron ore, mill scale or other oxide.

It is to be understood that the process of the invention above-described may be modified in many respects without departing from the scope of the same. For example, the preheating chamber of the reverberatory furnace may be used for pre-heating any alloying material to be added to the purified charge in the second decarbonizing furnace.

What I claim is:

1. A process for the production of refined iron, steel and alloy steel from pig iron containing impurities, which includes the steps of melting a charge of pig iron in a first furnace, oxidizing impurities other than carbon in said furnace by means of an oxidizing blast and removing carbon from the partly-refined charge maintained above its melting point in a second furnace by its reaction with iron oxide.

2. A process for the production of refined iron, steel and alloy steel from pig iron containing impurities which includes the steps of melting the pig iron charge in a first furnace, removing phosphorus and sulphur by a slag-forming action utilising lime in said furnace, removing manganese and silicon in said furnace by an oxidizing blast, transferring the molten partly-refined charge to a second furnace, heating said removed charge to a temperature above the melting point of the refined iron and removing the carbon in said second furnace by its reaction with iron oxide.

3. In a process for the production of refined iron, steel and allow steel from pig iron the steps of melting a charge of pig iron in a reverberatory furnace, removing phosphorus and sulphur by slag-forming action, blowing a stream of oxidizing gas across the surface of the charge to remove the slag and to oxidize silicon and manganese, stopping the blast of oxidizing gas prior to oxidation of carbon, tapping a portion of the molten partly-refined charge and transferring said portion to a decarbonizing furnace lined with an oxidizing lining and removing the carbon from the molten charge in said decarbonizing furnace by raising the temperature of said charge to a value above the melting point of the refined iron and solely by utilizing said oxidizing lining.

4. A process for the production of refined iron, steel or alloy steel as claimed in claim 1 in which the decarbonising process is effected in a reducing atmosphere with the charge out of contact with the flame.

5. A process for the production of refined iron, steel and alloy steel from pig iron containing impurities which includes the steps of melting a charge of pig iron in a first furnace, maintaining said charge at a temperature between 1350° and 1450° C., oxidizing manganese and silicon contained in said charge in said first furnace by means of an oxidizing blast, transferring part of said partly-refined charge to a second furnace, raising the temperature of the charge in said second furnace to between 1500° and 1650° C., and removing carbon from the charge in said second furnace by decarbonizing with iron oxide in a non-oxidizing atmosphere.

6. In a process for the production of refined iron from pig iron containing impurities the steps of melting a charge of pig iron in a reverberatory furnace, preheating a further charge of pig iron equal in amount to a fraction of the first charge in a preheating zone of said furnace prior to its introduction into said furnace, removing phosphorus and sulphur from said molten charge in said reverberatory furnace by a slagging action utilizing lime and removing manganese and silicon by an oxidizing blast, stopping said oxidizing blast prior to removal of carbon from said charge by said blast, transferring a portion of said partly-refined charge substantially equal in weight to said preheated charge of pig iron into a second furnace, maintaining the transferred portion of the charge in said second furnace constantly at a temperature above the melting point of said transferred portion removing carbon from the transferred portion of the charge in said second furnace by a puddling process using iron oxide in a non-oxidizing atmosphere, tapping the refined iron from said second furnace after removal of a predetermined amount of carbon and pouring said refined metal into moulds.

7. In a process for the production of steel and alloy steel from pig iron containing impurities the steps of melting a charge of pig iron in a reverberatory furnace, preheating a further charge of pig iron equal in amount to a fraction of the first charge in a preheating zone of said furnace prior to its introduction into said furnace, removing phosphorus and silicon from said molten charge in said reverberatory furnace by a slagging action utilising lime and removing manganese and silicon by an oxidizing blast, stopping said oxidizing blast prior to removal of carbon from said charge by said blast, transferring a portion of said partly-refined charge substantially equal in weight to said preheated charge of pig iron into a second furnace, maintaining the transferred portion of the charge in said second furnace constantly at a temperature above the melting point of said transferred portion removing carbon from the transferred portion of the charge in said second furnace by a decarbonizing process using iron oxide in a non-oxidizing atmosphere, adding necessary alloying materials to the transferred portion of the charge in said second furnace after removal of a predetermined amount of carbon therefrom, and super-heating said transferred portion of the charge in said second furnace to maintain the same in a molten condition during the alloying process.

8. A process for the production of refined iron as claimed in claim 6, in which the preheated charge of pig iron is transferred to the reverberatory furnace after the withdrawal of the portion of the partly-refined charge from said furnace.

9. A continuous process for the production of refined iron steel or alloy steels from pig iron containing impurities which includes the steps of melting a charge of pig iron in a reverberatory furnace, preheating a further charge of pig iron equal in amount to a fraction of the first charge in a preheating zone of said furnace, removing phosphorus and sulphur from the molten charge in said reverberatory furnace by a slagging action utilizing lime and removing manganese and silicon by an oxidizing blast stopping said oxidizing blast prior to removal of carbon in said reverberatory furnace, transferring a portion of said partly-refined charge substantially equal in weight to said pre-heated charge of pig iron into a second furnace, introducing said preheated charge into said reverberatory furnace, replacing the transferred preheated charge of pig iron in the preheating zone of said furnace by an equal charge of pig iron, removing the impurities other than carbon comprising phosphorus, sulphur, manganese and silicon from said preheated charge in said reverberatory furnace by a slagging action and by an oxidizing blast as aforesaid prior to said preheated charge, attaining the temperature of the remainder of the charge in said reverberatory furnace, repeating the previously enumerated steps in a continuous cycle, and removing the carbon from successive partly-refined charges transferred to said second furnace and maintained at a temperature above the melting point of said transferred charges by a decarbonizing process utilising iron oxide.

ALBERT COLLINSON NESFIELD.